US008468457B1

(12) United States Patent
Kay et al.

(10) Patent No.: US 8,468,457 B1
(45) Date of Patent: Jun. 18, 2013

(54) GLOBAL KEYBOARD SHORTCUTS MANAGEMENT FOR WEB APPLICATIONS

(75) Inventors: Erik Kay, Belmont, CA (US); Glen Murphy, Palo Alto, CA (US); Finnur Thorarinsson, Kopavogur (IS)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/267,317

(22) Filed: Oct. 6, 2011

Related U.S. Application Data

(63) Continuation of application No. 13/251,065, filed on Sep. 30, 2011.

(51) Int. Cl.
*G06F 3/00* (2006.01)
*G06F 9/445* (2006.01)

(52) U.S. Cl.
USPC .......................... 715/744; 715/760; 717/174

(58) Field of Classification Search
USPC ................................................ 715/760, 744
See application file for complete search history.

(56) References Cited

U.S. PATENT DOCUMENTS

| | | | | |
|---|---|---|---|---|
| 2005/0125745 | A1* | 6/2005 | Engestrom et al. | 715/847 |
| 2009/0064010 | A1* | 3/2009 | Sojan et al. | 715/764 |
| 2009/0158213 | A1* | 6/2009 | Ryu | 715/825 |

OTHER PUBLICATIONS

Web application (published Dec. 18, 2008) http://web.archive.org/web/20081218215445/http://en.wikipedia.org/wiki/Web_application.*
Browser extension (publised Apr. 18, 2009) http://web.archive.org/web/20090418182808/http://en.wikipedia.org/wiki/Browser_extension.*
MAC OS X Automation, "The Quick Twitter Palette," http://www.macosxautomation.com/services/learn/tut04/index.html, downloaded Sep. 29, 2011, pp. 1-5.
MSDN, "Keyboard Shortcuts in Visual Studio," msdn.microsoft.com/en-us/library/dd576362.aspx, downloaded Sep. 29, 2011, 1 page.

\* cited by examiner

*Primary Examiner* — Alvin Tan
*Assistant Examiner* — Rinna Yi
(74) *Attorney, Agent, or Firm* — Brake Hughes Bellermann LLP

(57) ABSTRACT

According to one general aspect, a computer-implemented method for managing global keyboard shortcuts is described. The method determines a web application or a browser extension accessible for execution by a browser of a client device. A user interface including available shortcut actions for the web application or the browser extension is provided, and a designation of a keyboard shortcut for an action from the available shortcut actions is received via the user interface. An association is created between the designated keyboard shortcut, the action, and a user account. The designated keyboard shortcut, the action, and the association may be stored on a server, and the designated keyboard shortcut, the action, and the association may be synced based on the user account.

23 Claims, 6 Drawing Sheets

GLOBAL KEYBOARD SHORTCUTS MANAGEMENT FOR WEB APPLICATIONS

RELATED APPLICATIONS

This application is a continuation of U.S. Non-Provisional patent application Ser. No. 13/251,065, filed Sep. 30, 2011, entitled, "GLOBAL KEYBOARD SHORTCUT MANAGEMENT FOR WEB APPLICATIONS," which is incorporated by reference herein in its entirety.

TECHNICAL FIELD

This disclosure generally relates to managing global keyboard shortcuts for software applications, and more particularly to designating and managing keyboard shortcuts for web browser applications and extensions via a user interface.

BACKGROUND

Keyboard shortcuts are often used for local applications, but may be useful for applications executable in a web browser, or for browser extensions. By defining keyboard shortcuts for web applications and browser extensions, a user may invoke the keyboard shortcuts when using any computing device (e.g., a smartphone, tablet, desktop, etc.), for example when the data is stored and synced on a server.

Developers may wish to bind a keyboard shortcut to an action for a web application or browser extension. For example, a developer may wish to assign a key or a combination of keys such as CTRL-SHIFT-X to launch a web application. Further, developers may have several actions within each web application for which they wish to assign keyboard shortcuts. Yet, if developers of every web application could assign a global keyboard shortcut, there would be a huge amount of conflicts, and user could get confused. Further, users may not agree with default keyboard shortcuts designated by certain developers. Accordingly, there exists a need for a global user interface to allow users to assign and modify their own keyboard shortcuts to a variety of functions for web applications and extensions.

SUMMARY

According to one general aspect, a computer-implemented method for managing global keyboard shortcuts includes determining a web application or a browser extension accessible for execution by a browser of a client device. A user interface including available shortcut actions for the web application or the browser extension is provided, and a designation of a keyboard shortcut for an action from the available shortcut actions is received via the user interface. An association is created between the designated keyboard shortcut, the action, and a user account.

In some embodiments, the designated keyboard shortcut, the action, and the association are stored on a server. The designated keyboard shortcut, the action, and the association may be synced based on the user account. The available shortcut actions may be determined based on information received from a developer. The user interface may include suggested keyboard shortcuts. The designated keyboard shortcut may be modified based on user input. Input to invoke the designated keyboard shortcut may be received and the action may be implemented based on the input. A user of the client computing device may be automatically prompted to input the designated keyboard shortcut. A determination may be made that the web application or the browser extension is associated with the user account.

According to another general aspect, a computer-implemented method for assigning global keyboard shortcuts includes receiving, at server, a designation of a keyboard shortcut for an action related to a web browser application. An association may be created at the server between the designated keyboard shortcut, the action, and a user account, and the association may be stored in a database at the server.

According to another general aspect, a tangible computer-readable storage medium may have recorded and stored thereon instructions that, when executed by one or more processors of a computer system cause the computer system to determine a web application that is accessible for execution by a browser on a client device. A user interface including available shortcut actions for the web application may be provided. The computer system may receive, via the user interface, a designation of a keyboard shortcut for an action from the available shortcut actions, and create an association between the designated keyboard shortcut, the action, and a user account.

According to another general aspect, an apparatus includes instructions stored on a computer-readable storage medium and executable by a processor to execute a browser application and thereby provide a browser interface. The apparatus includes a user interface configured to display shortcut management options for one or more applications executable by the browser application and a management module configured to cause the processor to enable keyboard shortcut designations for the applications through the user interface in the browser application. In some embodiments, the designated keyboard shortcut, the action, and the association are synced based on the user account, such that the association between the designated keyboard shortcut, the action, and the user account persists across a plurality of computing devices.

The details of one or more implementations are set forth in the accompanying drawings and the description below. Other features will be apparent from the description and drawings, and from the claims.

BRIEF DESCRIPTION OF THE DRAWINGS

Like reference symbols in the various drawings indicate like elements.

DETAILED DESCRIPTION

Figure 1:
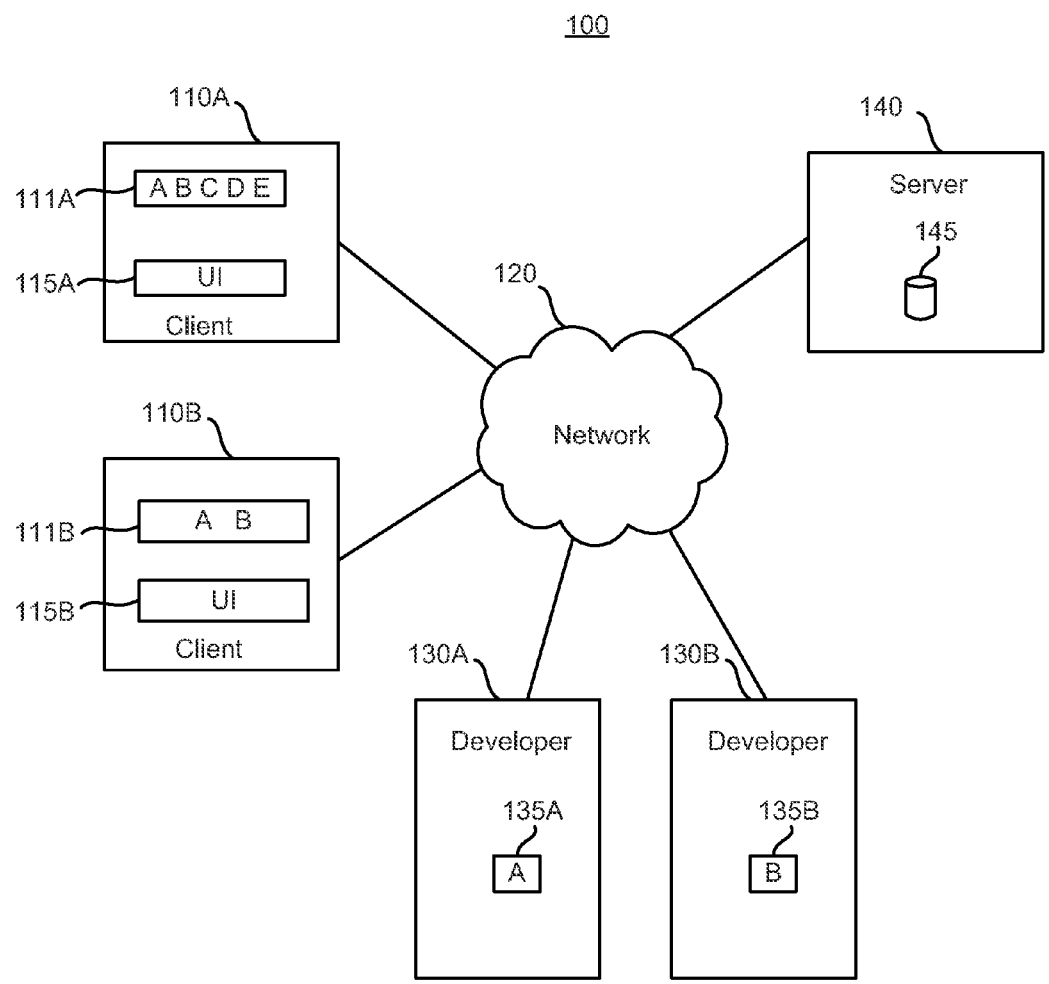
FIG. 1 is a block diagram of a system that can be used to assign global keyboard shortcuts.

Keyboard shortcuts may be used to invoke a software or operating system operation, and may serve as a way of invoking one or more commands that might otherwise be accessible only through a menu, a pointing device, different levels of a user interface, or via a command line interface. Some keyboard shortcuts allow a user to press a single key or a sequence of keys one after the other to invoke the desired command. Other keyboard shortcuts may require pressing and holding several keys simultaneously to invoke the desired command. Keyboard shortcuts generally expedite common operations by reducing input sequences to a few keystrokes or even a single keystroke. Each person may wish to define and manage his own set of keyboard shortcuts and bindings between specific keyboard shortcuts and specific commands.

A web browser executed by a client device can receive code (e.g., HTML code) from a remote server (e.g., a remote server that hosts a website) and can execute the receive code on the client device for the benefit of a user of the client device.

In various embodiments, the web browser may include or be associated with one or more web applications. In this context, a "web application" may be configured to a single task or multiple tasks for a user. In such an embodiment, the web application may be configured to be executed or interpreted by the web browser. This is compared with the native applications that include machine executable code and are configured to be executed directly by a processor or via the operating system of the client device, whereas, a web application may be incapable of execution or display without the aid of the web browser. Thus, web applications can be run inside a browser with a dedicated user interface, and typically provide functionality and an experience that is more rich and interactive than a standalone website but are less cumbersome and monolithic than a desktop application. Examples of web applications include games, photo editors, and video players that are run inside the browser.

Web applications can be "hosted applications" or "packaged applications." Hosted applications may include at least a portion of a web site that itself includes web pages, plus some metadata that may be especially pertinent to the web application or to the user of the web application to allow the web application to perform some particular functionality for the user. Packaged applications can be thought of as web applications whose code is bundled, so that the user can download all of the content of the web application for execution by the browser. A packaged web application may not need to have network access to perform its functionality for the user, and rather may be executed successfully by the browser locally on the computing device without access to a network. Packaged web applications have the option of using Extension APIs, allowing packaged applications to change the way the browser behaves or looks.

In various embodiments, the web browser may include or be configured to interact with one or more browser extensions. In this context, a "browser extension" may include one or more web pages packaged or grouped together as a definable whole, and configured to extend the functionality to the web browser. Thus, extensions also provide extra functionality to a browser, but generally, unlike web applications, there is little or no user interface component to the functionality provided by a browser extension. Instead, browser extensions extend the functionality of the browser and the websites being viewed in it. For example, browser extensions can extend the functionality of the browser by adding a new button to the address bar, such as an ever-present currency converter. Buttons like this can also apply to the current website being viewed—for example, clicking the currency converter button can convert all prices on the website presented to a user into a currency chosen by the user. In another example, an extension can be installed so that when a user hovers a cursor over a thumbnail image on a webpage executed by a browser a larger-size version of the image is displayed until the user moves the cursor away from the image. In another example, an extension may be installed to embed a "mail this" button next to every link in every page. Compared to web applications, extensions cut across websites and web applications.

Extensions may be in effect across all websites (though some are site-specific). Web applications may not combine with other applications in this way. Rather, web applications generally run standalone, like any regular website.

FIG. 1 is a block diagram of a system that can be used to manage global keyboard shortcuts. System 100 may include clients 110A and 110B, developers 130A and 130B, and server 140, which are interconnected through a network 120.

Clients 110A and 110B may be a computer or a similar device that may download and execute software applications, assign keyboard shortcuts, and communicate with server 140. Client 110 may execute software applications 111A, and may also view a global user interface 115A to manage keyboard shortcuts for the software applications 111A. Using user interface 115A, a user may, for example, assign shortcut keys to a variety of software applications 111A (e.g., web browser applications or extensions, which may also be known as "browser add-ins") executing on a browser on a display of client 110A. Client 111B may execute a different set of software applications 111B, and may also view a global user interface 115B to manage keyboard shortcuts for the software applications 111B. User interfaces 115A and 115B may include a list of browser extensions and current shortcuts leading to actions within the browser, such as a "print" action.

When a shortcut is invoked, an operating system of client 110A may handle the input event (e.g., a keyboard shortcut "CTRL-Q") and forward it to the active application, e.g., a browser executing on client 110A. Shortcuts may be handled by the browser and then sent to a renderer. For example, a user interface may include tabs whose content (i.e., webpages) are drawn (rendered) by a renderer process, or "renderer." The renderer may be separate from the browser process for security purposes, and not something a user sees. Events such as key presses (e.g., keyboard shortcuts) go to the browser process (which may be in the foreground), which in turn may send some or all of the events to the renderer process. If the renderer decides not to handle an event, the renderer may send the event back to the browser.

Unhandled shortcuts may come back to the browser for processing. The browser may first handle shortcuts so that certain reserved shortcuts, which should not be handled by the web page, are taken care of. For example, window management functions that a web page should not interfere with are handled by the browser. Additionally, a disabled web application or browser extension may not handle shortcuts.

Network 120 may be a single network or a combination of any type of computer network, such as a Local Area Network (LAN) or a Wide Area Network (WAN). In addition, network 120 may be a combination of public (e.g., Internet) and private networks.

Developer 130A is a client computer that is accessed by a software developer of application "A" 135A. Developer 130B is a different client computer accessed by a software developer of application "B" 135B.

As shown in FIG. 1, system 100 may also include server 140. Server 140 may be a computer or a similar device that communicates with clients 110A and 110B and developers 130A and 130B. In addition, server 140 may include a database 145 to store global shortcut key designations for various web browser applications and extensions (e.g., applications 135A, 135B) for each user. The global shortcut key designations may be stored (e.g., at database 145) individual for each user. The global shortcut key designations may be designated via user interfaces 115A and 115B, for example, as described in more detail below with respect to FIGS. 2 through 5.

Figure 2:
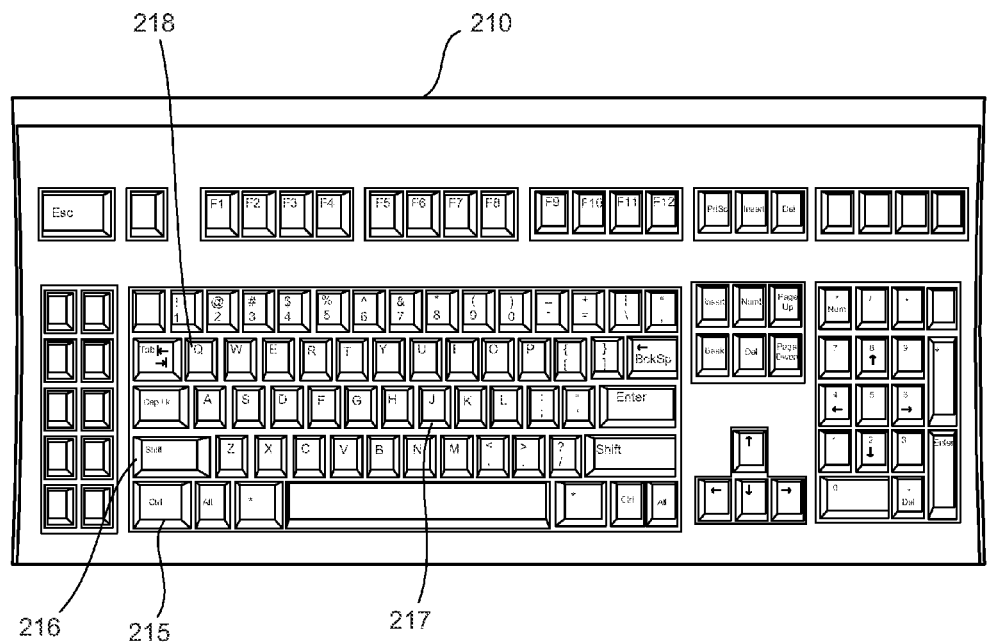
FIG. 2 is a block diagram of a keyboard.

FIG. 2 is a block diagram of a keyboard 210 that may be used by clients 110A, 110B, or developers 130A, 130B. Clients 110A and 110B may use any combination of keys on keyboard 210 to assign shortcuts to commands, or series of commands, that can be performed within web applications or extensions, via global user interface 115A, for example. Different users may assign different shortcuts to the same applications at their discretion. For example, Mark may wish to assign a shortcut CTRL-SHIFT-J (keys 215, 216, 217) to invoke a function within a spell-checking web application, whereas Mary may wish to assign the shortcut CRTL-Q (keys 215, 218) to invoke the same function within the spell-checking web application, as discussed in more detail below with respect to FIG. 3.

One skilled in the art will understand that the depiction of keyboard 210 is merely one illustrative example to which the disclosed subject matter is not limited. For example, keyboards with other visual layouts, multilingual keyboards, reduced-size keyboards, touchscreens, or input devices may be used by clients or developers to assign and invoke shortcuts.

Figure 3:
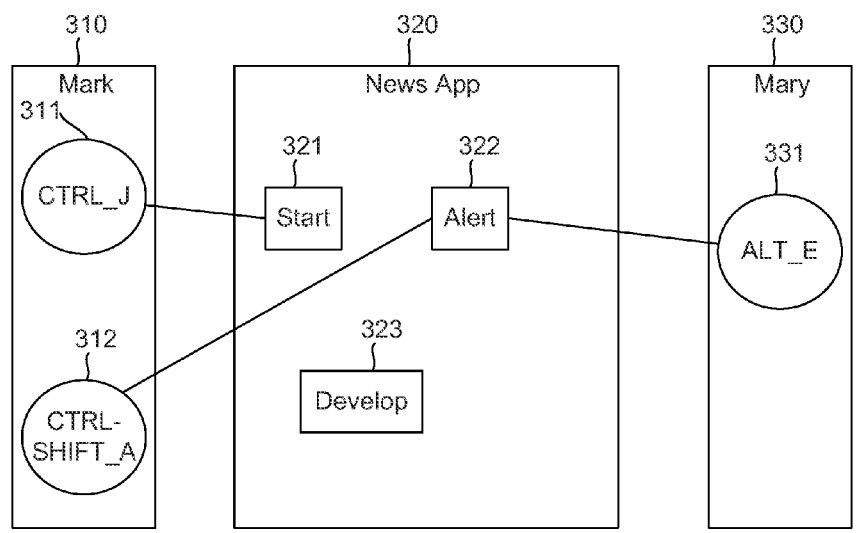
FIG. 3 illustrates a diagram of relationships between applications and shortcuts.

FIG. 3 illustrates a diagram of relationships between applications and shortcuts. As shown in FIG. 3, users 310 and 330 may assign different keyboard shortcuts to actions for the same "NewsApp" application 320, for example when the application is installed (e.g., based on key combinations suggested to a user during installation), or via a user interface (e.g., user interface 115A) accessible to a user. An exemplary user interface for assigning and managing keyboard shortcuts to web applications and browser extensions is described in more detail below with respect to FIGS. 4A and 4B.

For example, user 310, Mark, may assign "CTRL-J" (keyboard shortcut 311) to a start action 321 for application 320. Mark may also assign "CTRL-SHIFT-A" (keyboard shortcut 312) to alert action 322 within application 320. Mary, however, may decide to assign ALT-E (keyboard shortcut 331) to alert action 322. Further, application 320 may have various other actions, such as develop action 323, for which no users assign keyboard shortcuts.

Figure 4A:
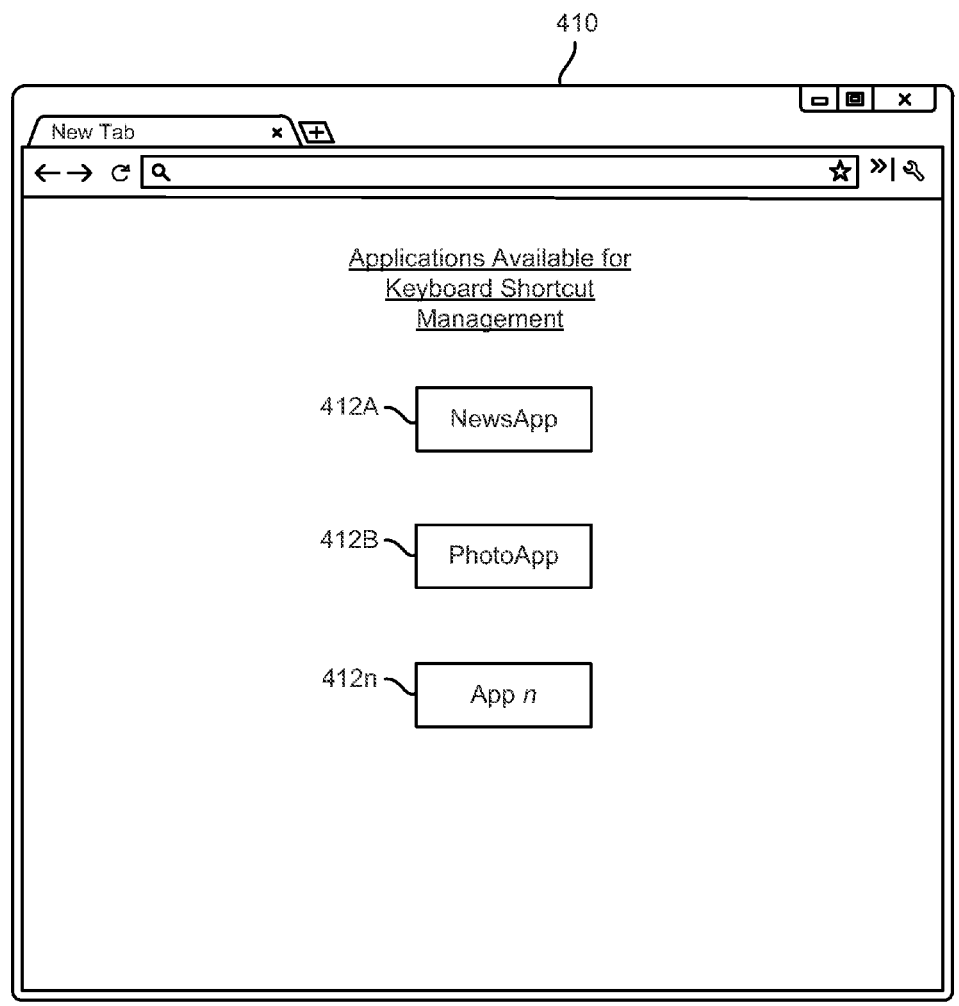
FIGS. 4A and 4B illustrate an exemplary user interfaces for managing global keyboard shortcuts.

A global user interface is needed to manage the shortcut assignments because so many users and developers may wish to assign different keyboard shortcuts to the many different actions that may be performed by thousands of different web applications and browser extensions. FIG. 4A illustrates an exemplary user interface for managing global keyboard shortcuts. FIG. 4A includes user interface 410, which may be displayed by a browser application that is executed by a computing device (e.g., client 110A shown in FIG. 1) that may be connected to a network (e.g., the Internet, or network 120 shown in FIG. 1). User interface 410 may present available applications, such as NewsApp 412A, PhotoApp 412B, through App n, 412n, which have been installed for execution on a browser by a user, and which have keyboard shortcut actions available to assign or modify. User interface 410 may be launched independent of a particular application.

An application (e.g., one of applications 412A, 412B, 412n) may be selected by a user who wishes to assign keyboard shortcuts to functions executable by the application. Upon selecting NewsApp 412A, for example, other options may be displayed in user interface 410, so that a user may enter keyboard shortcuts for functions executable by NewsApp 412A, as described in more detail below with respect to FIG. 4B.

Figure 4B:
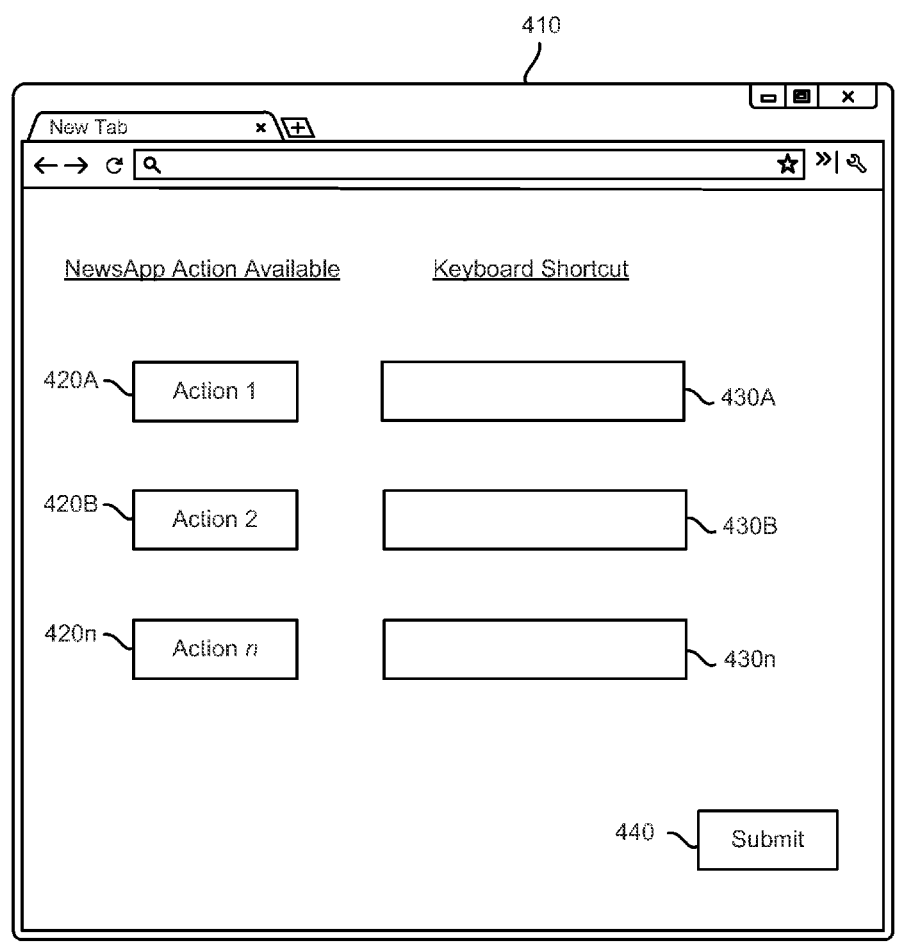

One skilled in the art will recognize that the depiction of user interface 410 and the arrangement of features in FIGS. 4A and 4B are merely for illustration and may be modified. For example, user interface 410 may display all the features depicted in FIGS. 4A and 4B at the same time within a single window, or in separate windows, for example.

FIG. 4B illustrates another exemplary user interface for managing global keyboard shortcuts. FIG. 4B includes user interface 410, including action fields 420A, 420B, 420n, which may include a list of actions available for an application (e.g., NewsApp 412A). The actions may be specified by developers of the applications, or in some embodiments, actions 420A, 420B, 420n may be defined by users. Keyboard shortcut fields 430A, 430B, 430n may include a list of potential keyboard shortcuts for each action. In certain embodiments, fields 430A, 430B, 430n may be empty for a user to fill in (as shown), or may include a suggested keyboard shortcut, for example a shortcut provided by a developer. User interface 410 may also include various other fields, such as submit button 440. In certain embodiments, after pressing submit button 440, data from user interface 410 may be transmitted via a network and stored in a database on a server, such as database 145 in server 140 as shown in FIG. 1. The configuration of user interface 410 and the fields and buttons shown in FIGS. 4A and 4B are merely for illustration, and fields may be added to, deleted, or modified. For example, user interface 410 may include another field that lists additional web browser extensions downloaded by a user, for which the user may assign keyboard shortcuts.

In another embodiment, an application may automatically prompt a user with a minimal version of user interface 410 to make it easy for the user to fill in a keyboard shortcut for a specific action. The application may provide the user with a hint about what it suggests a good key might be for the action, but the user may easily modify the suggested key.

In some embodiments, a developer of a web application or extension may have the ability to declare actions that can be bound to a key. The developer may make users aware of which actions are eligible for keyboard shortcuts and may give the user an opportunity to bind their own keyboard shortcut(s) to those action(s), for example using user interface 410.

Access to user interface 410 may be provided in a variety of ways. In some embodiments, user interface may appear after selection of an indicator within a web browser. In other embodiments, user interface may be displayed when an options tab is selected from a menu of a web browser, for example.

Keyboard shortcut data may be synced across the web for a user, for example using a user account and password. Therefore, user interface 410 may be accessible to a user from any device, so that a user does not need to worry about backing up keyboard shortcut assignments for her web applications and web extensions. For example, Mary may login to her user account from her smartphone, tablet, or desktop computer, and may view a list of her applications (e.g., applications 412A, 412B, 412n shown in FIG. 4A), as well as their associated actions and keyboard shortcuts, using any device. Further, a user may generate a list of keyboard shortcuts for sharing, downloading, or printing.

Figure 5:
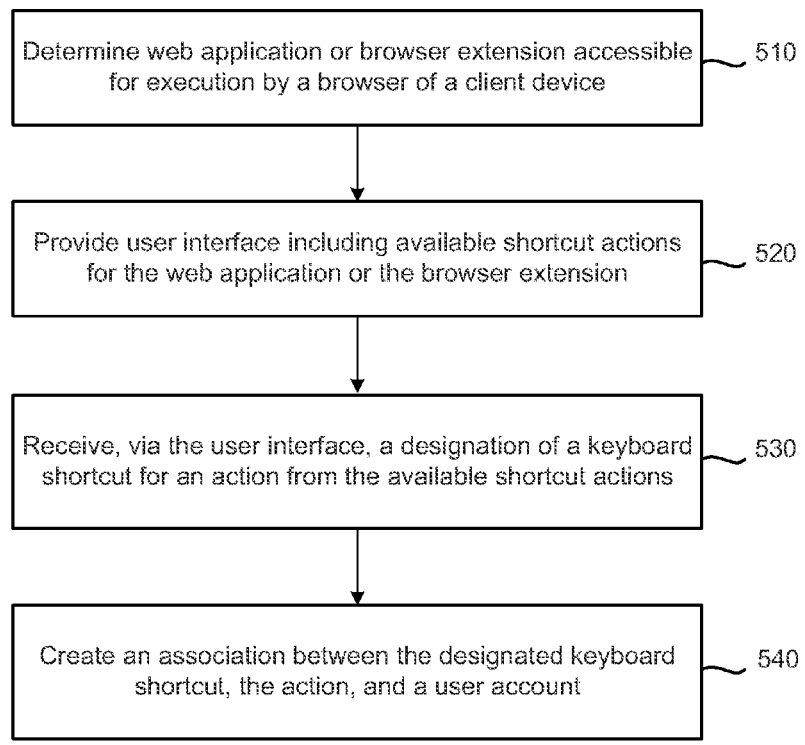
FIG. 5 is a flowchart of a process for assigning global keyboard shortcuts.

FIG. 5 is a flowchart of a process for managing global keyboard shortcuts. As shown in FIG. 5, a determination is made that a web application or browser extension (e.g., applications 111A shown in FIG. 1) is accessible for execution by a browser of a client computing device (e.g., client 110A shown in FIG. 1) (step 510). This determination may be made by server 140, shown in FIG. 1, for example. A user interface (e.g., user interface 410 shown in FIG. 4) including available shortcut actions for the web application or the browser extension is provided (step 520). A designation of a keyboard shortcut for an action from the available shortcut actions is received via the user interface (step 530). The input may be entered via, for example, keyboard 210. An association between the designated keyboard shortcut, the action, and a user account is created (step 540). In some embodiments, the association is stored in a database on a server, such database 145 shown in FIG. 1. In certain embodiments, a determination may be made whether the designated keyboard shortcut for the action conflicts with a stored designation, in which case, the user interface may display a prompt for a user to make a different designation. For example, if the shortcut CTRL-K is already currently used by another function within an application, the user interface may display a warning.

The available shortcut actions may be based on information received from developers of browser extensions, such as developers 130A, 130B shown in FIG. 1. The designated keyboard shortcuts may be user-specific or client-specific, such that other users or clients, such as client 110B, may make different keyboard shortcuts for the same applications (e.g., applications 111B) executing at a client 110B. As explained above with respect to FIG. 3, for example, Mark, user 310, may make different keyboard shortcuts for the same application (application 320) than Mary, user 330.

Figure 6:
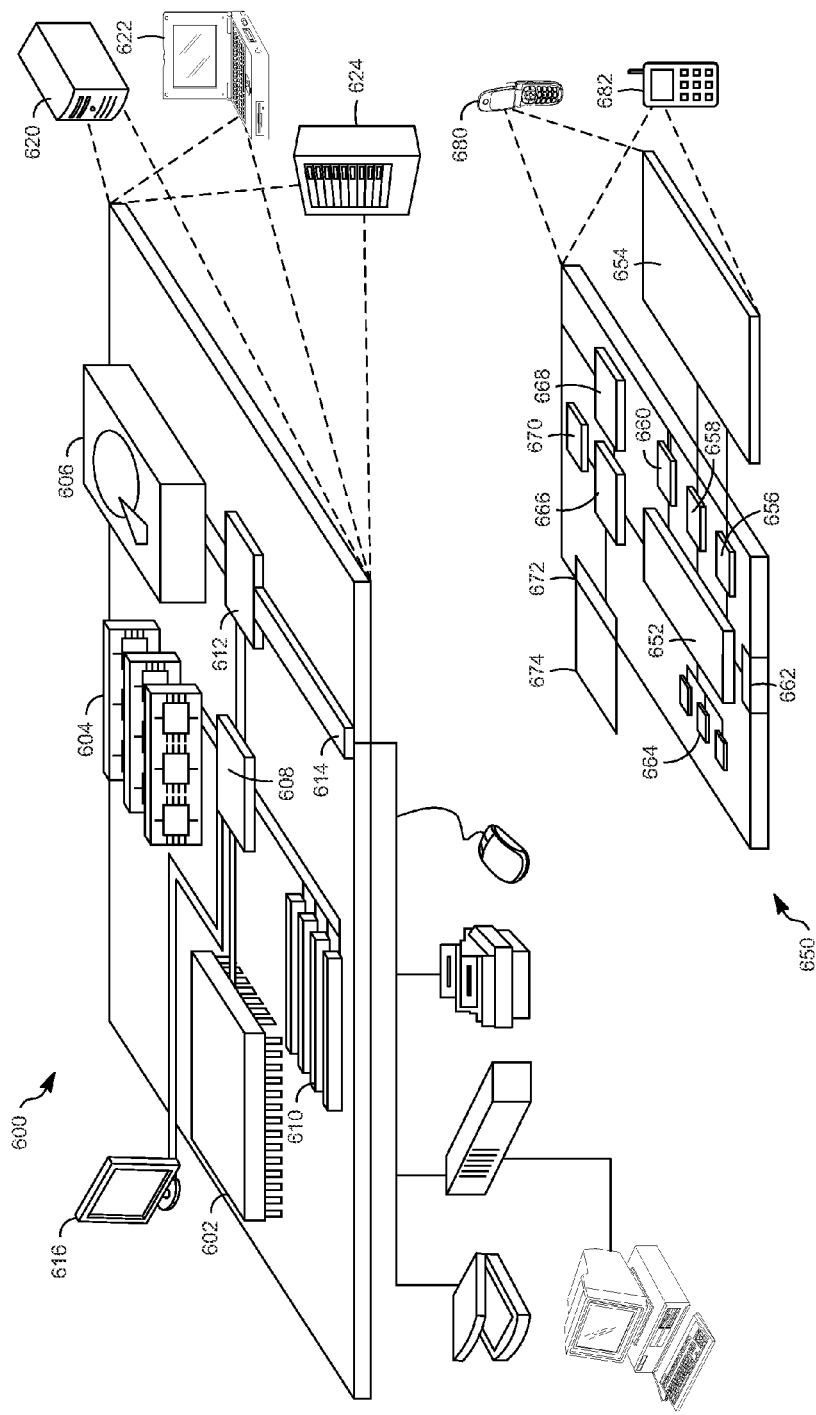
FIG. 6 illustrates an example of a computer device and a mobile computer device that can be used to implement the techniques described here.

FIG. 6 illustrates an example of a computer device and a mobile computer device that can be used to implement the techniques described here. Computing device 600 is intended to represent various forms of digital computers, such as laptops, desktops, workstations, personal digital assistants, servers, blade servers, mainframes, and other appropriate computers. Computing device 650 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 604 stores information within the computing device 600. In one implementation, the memory 604 is a volatile memory unit or units. In another implementation, the memory 604 is a non-volatile memory unit or units. The memory 604 may also be another form of computer-readable medium, such as a magnetic or optical disk.

The storage device 606 is capable of providing mass storage for the computing device 600. In one implementation, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 604, the storage device 606, or memory on processor 602.

The high speed controller 608 manages bandwidth-intensive operations for the computing device 600, while the low speed controller 612 manages lower bandwidth-intensive operations. Such allocation of functions is exemplary only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices communicating with each other.

Computing device 650 includes a processor 652, memory 664, an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various buses, and several of the components may be mounted on a common motherboard or in other manners as appropriate.

The processor 652 can execute instructions within the computing device 650, including instructions stored in the memory 664. The processor may be implemented as a chipset of chips that include separate and multiple analog and digital processors. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT LCD (Thin-Film-Transistor Liquid Crystal Display) or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provided in communication with processor 652, so as to enable near area communication of device 650 with other devices. External interface 662 may provide, for example, for wired communication in some implementations, or for wireless communication in other implementations, and multiple interfaces may also be used.

The memory 664 stores information within the computing device 650. The memory 664 can be implemented as one or more of a computer-readable medium or media, a volatile memory unit or units, or a non-volatile memory unit or units. Expansion memory 674 may also be provided and connected to device 650 through expansion interface 672, which may include, for example, a SIMM (Single In Line Memory Module) card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provided as a security module for device 650, and may be programmed with instructions that permit secure use of device 650. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, or memory on processor 652, that may be received, for example, over transceiver 668 or external interface 662.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, WiFi, or other such transceiver (not shown). In addition, GPS (Global Positioning System) receiver module 670 may provide additional navigation- and location-related wireless data to device 650, which may be used as appropriate by applications running on device 650.

Device 650 may also communicate audibly using audio codec 660, which may receive spoken information from a user and convert it to usable digital information. Audio codec 660 may likewise generate audible sound for a user, such as through a speaker, e.g., in a handset of device 650. Such sound may include sound from voice telephone calls, may include recorded sound (e.g., voice messages, music files, etc.) and may also include sound generated by applications operating on device 650.

The computing device 650 may be implemented in a number of different forms, as shown in the figure. For example, it may be implemented as a cellular telephone 680. It may also be implemented as part of a smart phone 682, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A computer-implemented method for managing global keyboard shortcuts, comprising:

determining a plurality of web applications or browser extensions accessible for execution by a browser of a client device, the plurality of web applications or browser extensions each including at least one web page;

providing a user interface including available shortcut actions for the plurality of web applications or browser extensions, the user interface configured to allow assignment of keyboard shortcuts for the available shortcut actions for each of the plurality of web applications or browser extensions;

receiving, via the user interface, a designation of a keyboard shortcut for an action from the available shortcut actions;

creating an association between the designated keyboard shortcut, the action, and a user account; and automatically prompting, by one of the plurality of web applications or browser extensions, an input via the user interface of the designated keyboard shortcut during installation of the one of the plurality of web applications or browser extensions for execution by the browser.

2. The computer-implemented method of claim 1, wherein the designated keyboard shortcut, the action, and the association are stored on a server.

3. The computer-implemented method of claim 2, wherein the designated keyboard shortcut, the action, and the association are synced based on the user account.

4. The computer-implemented method of claim 1, wherein the available shortcut actions are determined based on information received from a developer.

5. The computer-implemented method of claim 1, wherein the user interface includes suggested keyboard shortcuts.

6. The computer-implemented method of claim 1, further comprising:
modifying the designated keyboard shortcut based on user input.

7. The computer-implemented method of claim 1, further comprising:
receiving a designated input to invoke the designated keyboard shortcut; and
implementing the action based on the designated input.

8. The computer-implemented method of claim 1, further comprising:
determining the plurality of web applications or browser extensions are associated with the user account.

9. A computer-implemented method for assigning global keyboard shortcuts, comprising:
providing a user interface configured to allow assignment of keyboard shortcuts for available shortcut actions for each of a plurality of web applications or browser extensions installed for execution by a browser;
receiving, at a server, a designation of a keyboard shortcut for an action related to a function of a web application, wherein the web application is one of the plurality of web applications installed for the execution by the browser, and wherein the web application includes at least one web page;
creating, at the server, an association between the designated keyboard shortcut, the action, and a user account;
storing, the association in a database at the server; and
automatically prompting, by the web application, an input via the user interface of the designated keyboard shortcut during installation of the web application for execution by the browser.

10. A non-transitory computer-readable storage medium having recorded and stored thereon instructions that, when executed by one or more processors of a computer system cause the computer system to:
determine a plurality of web applications accessible for execution by a browser on a client device, the plurality of web applications each including at least one web page;
provide a user interface including available shortcut actions for the plurality of web applications, the user interface configured to allow assignment of keyboard shortcuts for the available shortcut actions for each of the plurality of web applications;
receive, via the user interface, a designation of a keyboard shortcut for an action from the available shortcut actions;
create an association between the designated keyboard shortcut, the action, and a user account; and
automatically prompt, by one of the plurality of web applications, an input via the user interface of the designated keyboard shortcut during installation of the one of the plurality of web applications for execution by the browser.

11. The non-transitory computer-readable storage medium of claim 10, wherein the available shortcut actions are determined based on information received from a developer of a web application.

12. The non-transitory computer-readable storage medium of claim 10, wherein the user interface includes suggested keyboard shortcuts.

13. The non-transitory computer-readable storage medium of claim 10, wherein the instructions further cause the computer system to: enable modification of the designated keyboard shortcut.

14. The non-transitory computer-readable storage medium of claim 10, wherein the instructions further cause the computer system to:
receive, via a network, input to invoke the designated keyboard shortcut; and
implement the action based on the input.

15. The non-transitory computer-readable storage medium of claim 10, wherein the instructions further cause the computer system to:
store the association in a database of a server.

16. A system including instructions stored on a non-transitory computer-readable storage medium and executable by a processor to execute a browser application and thereby provide a browser interface, the system comprising:
a user interface configured to display shortcut management options to allow assignment of keyboard shortcuts for available shortcut actions for each of a plurality of web applications, the plurality of web applications being executable by the browser application and including at least one web page; and
a management module configured to cause the processor to enable keyboard shortcut designations for the plurality of web applications through the user interface in the browser application, and
automatically prompt, by one of the plurality of web applications, a user to input via the user interface of a designated keyboard shortcut for one of the available shortcut actions, during installation of the one of the plurality of web applications for execution by the browser application.

17. The system of claim 16 wherein the management module is configured to determine shortcut actions available for the plurality of web applications.

18. The system of claim 16, wherein the keyboard shortcut designations are assigned to shortcut actions previously defined by a developer of at least one of the plurality of web applications.

19. The system of claim 16, wherein the shortcut management options include suggested keyboard shortcuts.

20. The system of claim 16, wherein the management module is configured to enable an option to modify the keyboard shortcut designations.

21. The system of claim 16, wherein the plurality of web applications are associated with a user account.

22. The system of claim 16, wherein the designated keyboard shortcut, an action, and an association between the designated keyboard shortcut, the action, and a user account are stored on a server.

23. The system of claim 22, wherein the designated keyboard shortcut, the action, and the association are synced based on the user account, such that the association between the designated keyboard shortcut, the action, and the user account persists across a plurality of computing devices.

* * * * *